United States Patent
Shen et al.

(10) Patent No.: US 11,128,769 B2
(45) Date of Patent: Sep. 21, 2021

(54) IMAGE PROCESSING APPARATUS HAVING DISPLAY DEVICE, IMAGE DISPLAY PROCESSING METHOD, AND NON-TRANSITORY STORAGE MEDIUM STORING INSTRUCTIONS EXECUTABLE BY THE IMAGE PROCESSING APPARATUS HAVING THE SAME

(71) Applicant: BROTHER KOGYO KABUSHIKI KAISHA, Nagoya (JP)

(72) Inventors: Haixia Shen, Nagoya (JP); Yuka Hattori, Mizuho (JP)

(73) Assignee: BROTHER KOGYO KABUSHTKI KAISHA, Nagoya (JP)

( * ) Notice: Subject to any disclaimer, the term of this patent is extended or adjusted under 35 U.S.C. 154(b) by 0 days.

(21) Appl. No.: 16/815,618

(22) Filed: Mar. 11, 2020

(65) Prior Publication Data
US 2020/0304660 A1    Sep. 24, 2020

(30) Foreign Application Priority Data
Mar. 18, 2019 (JP) .............................. JP2019-049879

(51) Int. Cl.
*H04N 1/00* (2006.01)

(52) U.S. Cl.
CPC ....... *H04N 1/00477* (2013.01); *H04N 1/0044* (2013.01)

(58) Field of Classification Search
None
See application file for complete search history.

(56) References Cited

U.S. PATENT DOCUMENTS

| | | | |
|---|---|---|---|
| 6,633,410 B1 | 10/2003 | Narushima | |
| 2010/0134820 A1* | 6/2010 | Nakamura | G06Q 30/06 358/1.14 |
| 2014/0380250 A1* | 12/2014 | Yoshida | G06F 3/0488 715/863 |

FOREIGN PATENT DOCUMENTS

JP        2000-66860 A      3/2000

* cited by examiner

*Primary Examiner* — Thomas D Lee
(74) *Attorney, Agent, or Firm* — Merchant & Gould P.C.

(57) ABSTRACT

An image processing apparatus includes: a reading device; a display device; an input interface; and a controller configured to: control the reading device to read an image formed on a reading medium to create read-image data; control the display device to display a preview screen containing the read image; execute a particular processing based on the read-image data when a processing executing instruction is input via the input interface after the preview screen is displayed; and when a first particular length of time has passed, without input of the processing executing instruction, from a time when the preview screen is displayed, control the display device to display a waiting screen containing a first message indicating that the particular processing has not been executed, instead of the preview screen.

14 Claims, 6 Drawing Sheets

IMAGE PROCESSING APPARATUS HAVING DISPLAY DEVICE, IMAGE DISPLAY PROCESSING METHOD, AND NON-TRANSITORY STORAGE MEDIUM STORING INSTRUCTIONS EXECUTABLE BY THE IMAGE PROCESSING APPARATUS HAVING THE SAME

CROSS REFERENCE TO RELATED APPLICATION

The present application claims priority from Japanese Patent Application No. 2019-049879, which was filed on Mar. 18, 2019, the disclosure of which is herein incorporated by reference in its entirety.

BACKGROUND

The following disclosure relates to a technique of processing a read image.

There is known a printer apparatus configured to, in printing a read image, display the image before printing and perform printing upon receiving a print instruction thereafter.

SUMMARY

In this kind of the printer apparatus, if the printer apparatus continues displaying the read image until a user performs an operation, there is a possibility of hindering another user from using the printer apparatus. Thus, it is convenient that, in the case where a particular length of time has passed without user's instruction after the read image is displayed, the read image is switched to another screen to allow another user to use the printer apparatus.

If the displayed read image is switched to another screen without printing of the image, however, it may become difficult for the user to notice that the read image has not been printed yet. That is, there is a possibility of lowered convenience to the user having operated the printer apparatus to read the image.

Accordingly, an aspect of the disclosure relates to a technique with improved usability of the image processing apparatus configured to display a read image before processing the read image.

In one aspect of the disclosure, an image processing apparatus includes: a reading device; a display device; an input interface; and a controller configured to execute: a reading processing in which the controller controls the reading device to read an image formed on a reading medium to create read-image data; a preview-screen display processing in which the controller controls the display device to display a preview screen containing a read image that is the image read in the reading processing; a read-image processing in which the controller executes a particular processing based on the read-image data when a processing executing instruction is input via the input interface after the preview screen is displayed in the preview-screen display processing; and a waiting-screen display processing in which, when a first particular length of time has passed, without input of the processing executing instruction, from a time when the preview screen is displayed in the preview-screen display processing, the controller controls the display device to display a waiting screen containing a first message indicating that the particular processing has not been executed, instead of the preview screen.

In another aspect of the disclosure, an image processing method includes: a reading step of reading an image formed on a reading medium to create read-image data; a preview-screen displaying step of displaying a preview screen containing a read image that is the image read in the reading step; a read-image processing step of executing a particular processing based on the read-image data when a processing executing instruction is input after the preview screen is displayed in the preview-screen displaying step; and a waiting-screen displaying step of displaying a waiting screen containing a first message indicating that the particular processing has not been executed, instead of the preview screen, when a first particular length of time has passed, without input of the processing executing instruction, from a time when the preview screen is displayed in the preview-screen displaying step.

In yet another aspect of the disclosure, a non-transitory storage medium stores a plurality of instructions executable by a processor of an image processing apparatus including a reading device and a display device. The plurality of instructions, when executed by the processor, cause the image processing apparatus to execute: a reading processing in which the image processing apparatus controls the reading device to read an image formed on a reading medium to create read-image data; a preview-screen display processing in which the image processing apparatus controls the display device to display a preview screen containing a read image that is the image read in the reading processing; a read-image processing in which the image processing apparatus executes a particular processing based on the read-image data when a processing executing instruction is input via the input interface after the preview screen is displayed in the preview-screen display processing; and a waiting-screen display processing in which, when a first particular length of time has passed, without input of the processing executing instruction, from a time when the preview screen is displayed in the preview-screen display processing, the image processing apparatus controls the display device to display a waiting screen containing a first message indicating that the particular processing has not been executed, instead of the preview screen.

In yet another aspect of the disclosure, an image processing apparatus includes: a reading device; a display device; an input interface; and a controller configured to execute: a reading processing in which the controller controls the reading device to read an image formed on a reading medium to create read-image data; a preview-screen display processing in which the controller controls the display device to display a preview screen containing a read image that is the image read in the reading processing; a read-image processing in which the controller executes a particular processing based on the read-image data when a processing executing instruction is input via the input interface after the preview screen is displayed in the preview-screen display processing; and a message display processing in which, after the preview screen is displayed in the preview-screen display processing, the controller controls the display device to display a first message indicating that the particular processing has not been executed.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

Hereinafter, there will be described one embodiment by reference to the drawings.

Configuration of Image Processing System

Figure 1:
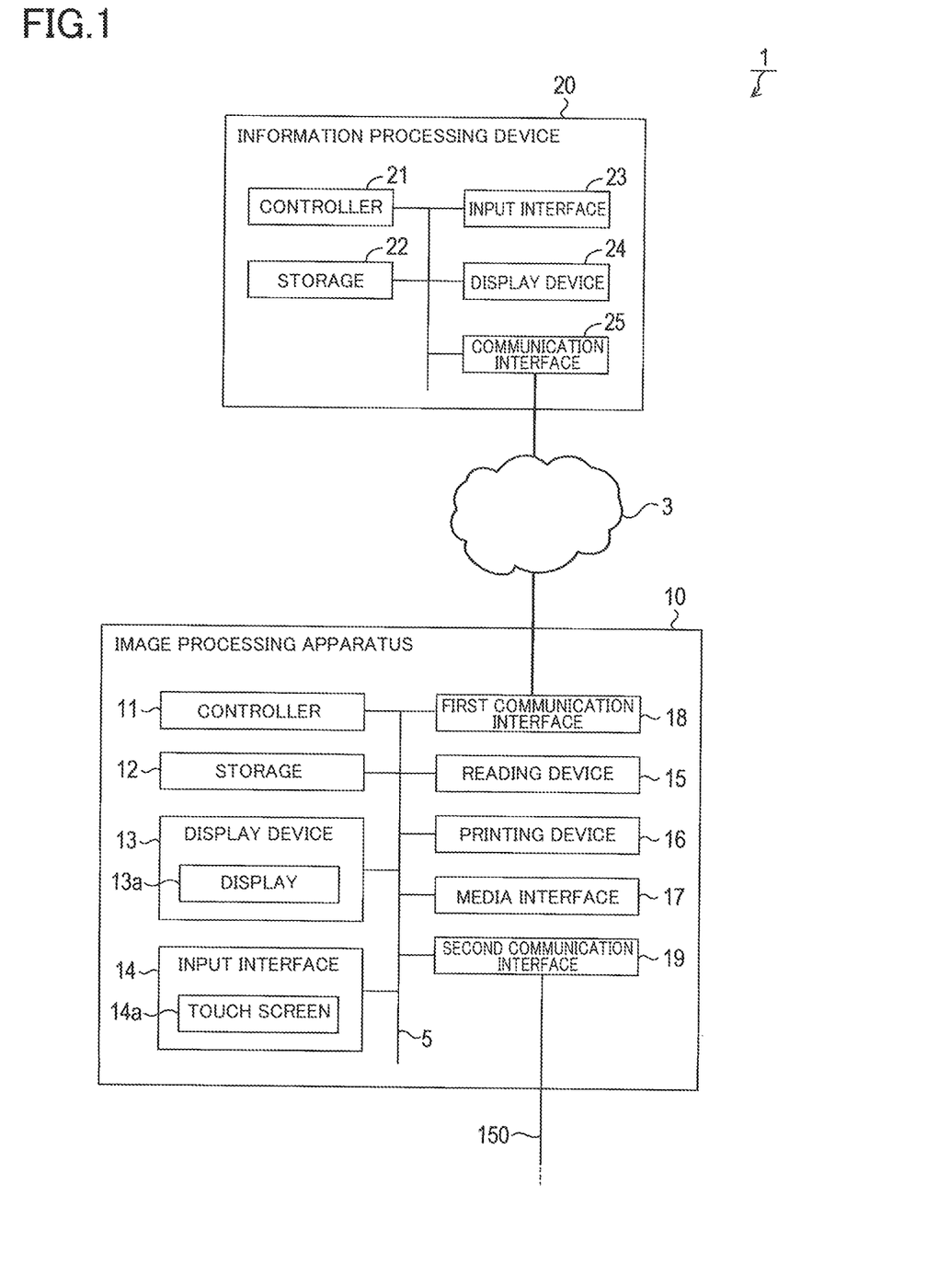
FIG. 1 is a view for explaining a configuration of an image processing system in one embodiment.

As illustrated in FIG. 1, an information processing system 1 includes an image processing apparatus 10 according to the present embodiment and an information processing device 20. The image processing apparatus 10 and the information processing device 20 are capable of performing data communication with each other over a network 3. The network 3 may be any network. The network 3 may be any of a wired network and a wireless network, for example. Each of the wired network and the wireless network may employ any communication standard.

Configuration of Image Processing Apparatus 10

The image processing apparatus 10 according to the present embodiment in FIG. 1 has a plurality of functions including a scanning function, a printing function, a copying function, and a facsimile function, for example. The scanning function is a function for reading an image formed on a document to create image data based on the read image. The printing function is a function for printing an image on a recording sheet. The copying function is a function using the printing function to print an image read in the scanning function. The facsimile function is a function for transmitting and receiving facsimile data.

As illustrated in FIG. 1, the image processing apparatus 10 includes a controller 11, a storage 12, a display device 13, an input interface 14, a reading device 15, a printing device 16, a media interface 17, a first communication interface 18, and a second communication interface 19, which are connected to each other via a bus 5.

The controller 11 includes a central processing unit (CPU), for example. The storage 12 includes semiconductor memories including a read-only memory (ROM), a random-access memory (RAM), a nonvolatile random access memory (NVRAM), and a flash memory, for example. That is, the image processing apparatus 10 according to the present embodiment includes a microcomputer including the CPU and the semiconductor memories.

The controller 11 performs various functions by executing programs stored in a non-transitory storage medium. In the present embodiment, the storage 12 is one example of the non-transitory storage medium storing the programs. It is noted that the various functions to be performed by the controller 11 are not limited to those performed by execution of the programs (i.e., a software processing), and some or all of the functions may be performed using one or more hardware devices.

Figure 2:
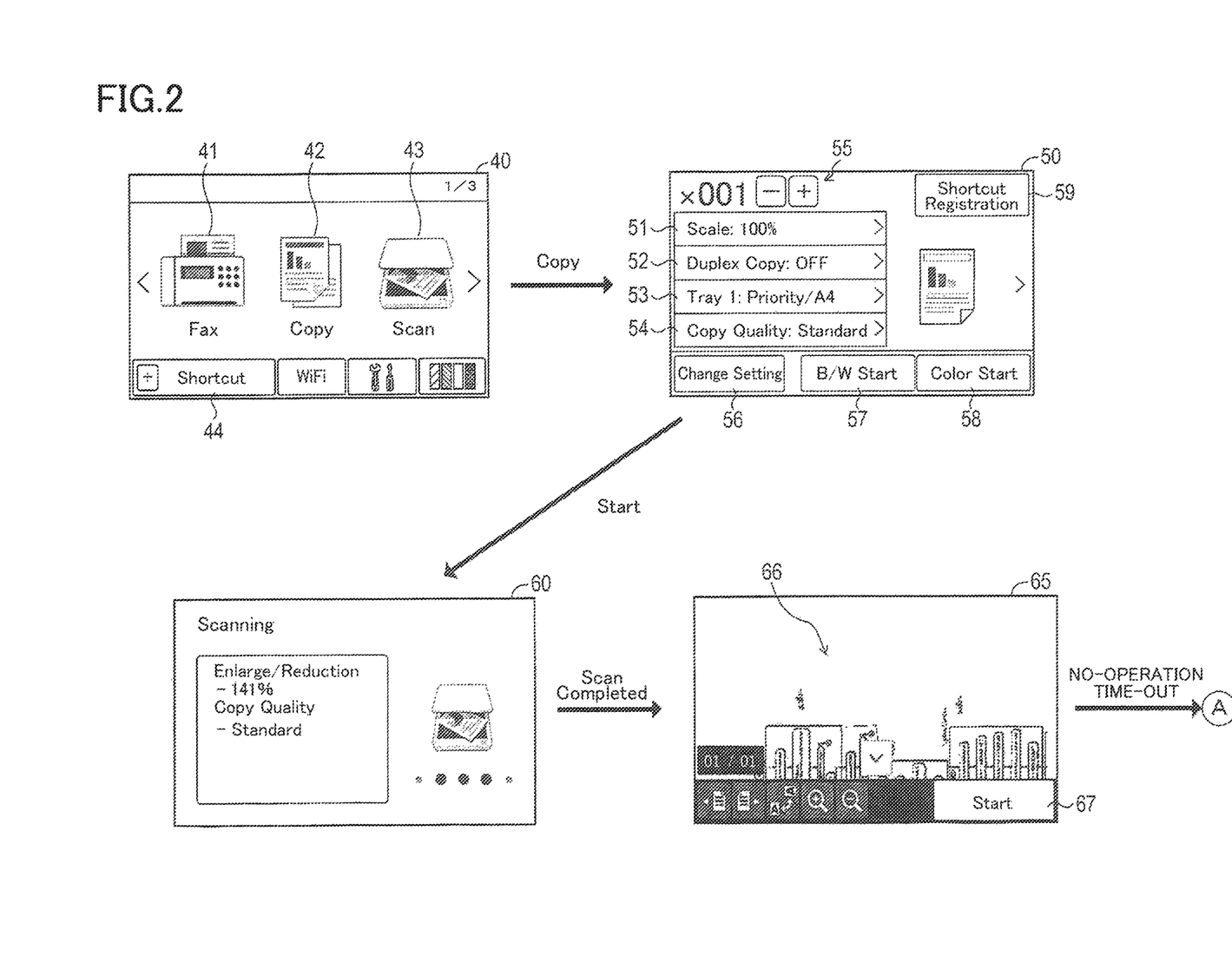
FIG. 2 is a view for explaining portions of screen transition in performing of a preview corresponding function.
Figure 3:
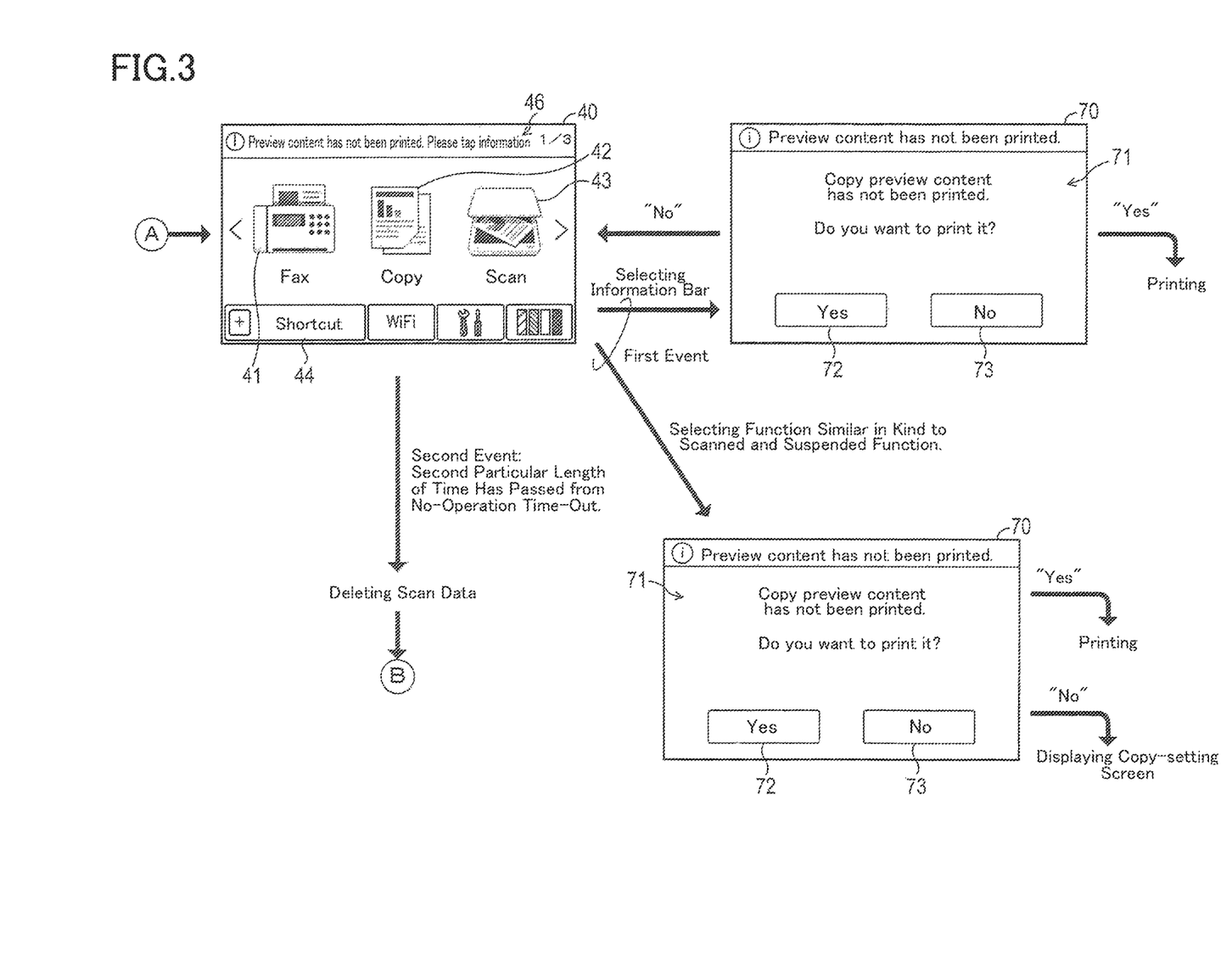
FIG. 3 is a view for explaining other portions of the screen transition (continued from FIG. 2) in performing of the preview corresponding function.
Figure 4:
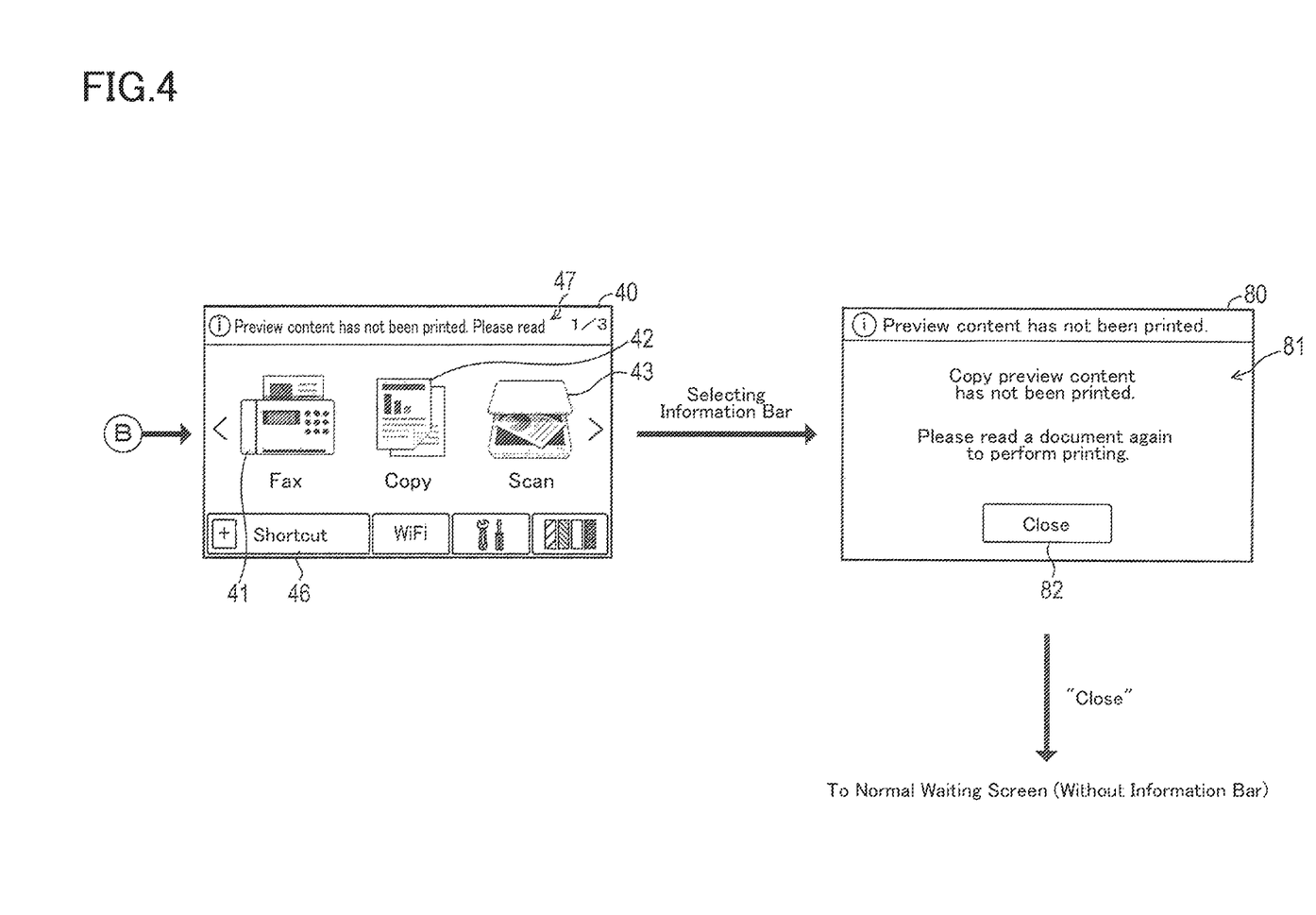
FIG. 4 is a view for explaining yet other portions of the screen transition (continued from FIG. 3) in performing of the preview corresponding function.

The storage 12 stores data relating to various screens including screens illustrated in FIGS. 2-4. The storage 12 further stores programs for a main process illustrated in FIGS. 5 and 6. The display device 13 in the present embodiment includes a display 13a for displaying various kinds of information.

The input interface 14 includes an input device for accepting various input operations. In the present embodiment, the input interface 14 includes a touch screen 14a as the input device. The touch screen 14a is superposed on an image display region of the display device 13. The image display region is a region on which an image is to be displayed.

The touch screen 14a superposed on the image display region of the display device 13 is configured to detect an instructing operation that is a touch or an approach of an input object on or to the image display region. That is, in the case where a user is performing the instructing operation with the input object relative to the image display region, the touch screen 14a can output positional information representing an instructed position at which the user is performing the instructing operation. In the present embodiment, the touch screen 14a is configured to continuously or periodically output the positional information while the instructing operation is being performed with the input object.

It is noted that the touch screen 14a may be configured to detect any of only a touch of the input object, only an approach of the input object, and both of a touch and an approach of the input object as the instructing operation.

The controller 11 is configured to obtain the positional information output from the touch screen 14a and based on the obtained positional information detect (i) the presence or absence of the instructing operation with the input object, (ii) the instructed position in the case where the user is performing the instructing operation, and (iii) at least one type of a specific operation with the input object in the case where the user is performing the instructing operation.

Examples of the specific operation detectable by the controller 11 include a tap, a flick, and a drag. The tap is an operation in which, after the instructing operation is performed with the input object, the input object moves off or away from the touch screen 14a at the same position. Examples of the input object to be used for the instructing operation include a fingertip and a particular instructing device such as a stylus.

The reading device 15 includes an image sensor and is configured to read an image formed on a document to create image data based on the read image. Hereinafter, the read image and the image data based on the read image may be hereinafter referred to as "scanned image" and "scanned data", respectively. The image sensor may be any of a charge-coupled-device (CCD) image sensor and a complementary-metal-oxide-semiconductor (CMOS) image sensor, for example. The document may be any of at least one of a paper sheet, a cloth, and a label, for example.

It is noted that the image processing apparatus 10 includes a document table, not illustrated, for supporting a document. The reading device 15 is configured to read an image formed on the document placed on the document table. The image processing apparatus 10 may include an automatic document feeder (ADF). The reading device 15 may be configured to perform what is called duplex scanning for reading images on both sides of at least one of the document placed on the document table and the document set on the ADF.

The printing device 16 includes an ink-jet or electrophotographic printing mechanism and is capable of printing an image on the recording sheet. For example, the media interface 17 is an interface on which at least one of various storage media such as a USB flash memory is to be mounted. The media interface 17 controls writing and reading of data into or from the mounted storage medium.

The first communication interface 18 is a communication interface capable of connecting the image processing apparatus 10 to the network 3. The image processing apparatus 10 is capable of performing data communication via the first communication interface 18 with various information processing devices including the information processing device 20. The image processing apparatus 10 is connectable to the Internet via the first communication interface 18 to perform data communication over the Internet with other various servers and/or various information processing devices, for example.

The second communication interface 19 is an interface for communicating with an external device over a communication network 150. The communication network 150 connected to the second communication interface 19 is a public telephone network in the present embodiment, for example. Transmission and reception of facsimile data in the facsimile function are principally performed via the second communication interface 19.

The scanning function is principally performed by control of the reading device 15 by the controller 11. Specifically, the scanning function in the present embodiment includes a plurality of sub-functions each relating to a method of processing the scanned image. Examples of the sub-functions include a scan-to-USB-memory function, a scan-to-PC function, and a scan-to-email-transmission function. The scan-to-USB-memory function is a function for outputting and storing the scanned data into the USB memory connected to the media interface 17. The scan-to-PC function is a function of transmitting the scanned data to another information processing device connected to the image processing apparatus 10. The scan-to-email-transmission function is a function of transmitting the scanned data by an electronic mail.

The copying function is principally performed by control of the reading device 15 and the printing device 16 by the controller 11. That is, the controller 11 obtains the scanned data by controlling the reading device 15 to read an image formed on the document, i.e., by performing the scanning function. The controller 11 thereafter outputs a printed material by controlling the printing device 16 to perform printing based on the scanned data, i.e., by performing the printing function. The printed material is a recording sheet on which the scanned image is printed.

In the image processing apparatus 10 according to the present embodiment, the display device 13 displays a preview screen 65 illustrated in FIG. 2 after image reading in some or all of various functions including the scanning function and before a particular processing is executed based on scanned data. The preview screen 65 contains a preview image 66 and a start button 67. The preview image 66 represents a scanned image. Functions configured to display the preview screen of the scanned image may be hereinafter referred to as "preview corresponding functions".

The scanning function is one of the preview corresponding functions. That is, the preview screen 65 containing the preview image 66 representing the scanned image is displayed in the scan-to-USB-memory function before the particular processing based on the scanned data is executed, that is, before the scanned data is stored into the USB memory, for example.

The copying function is another of the preview corresponding functions. That is, the preview screen 65 containing the preview image 66 representing the scanned image is displayed in the copying function after an image formed on the document is read and before the particular processing based on the scanned data is executed, that is, before the scanned image is printed. The preview image 66 displayed in performing of the copying function may contain an image indicating the outer edges of the recording sheet. That is, the preview image 66 may represent a state in which the scanned image is actually printed on the recording sheet.

A facsimile transmitting function for transmitting facsimile data as one of the facsimile functions is yet another of the preview corresponding functions. That is, the preview screen containing the scanned image is displayed in the facsimile transmitting function after an image formed on the document is read and before the particular processing based on the scanned data is executed, that is, before the scanned image is transmitted via the second communication interface 19. The preview image 66 displayed in performing of the facsimile transmitting function may contain the image indicating the outer edges of the recording sheet. That is, the preview image 66 may represent a state in which an image represented by the facsimile data is actually printed on the recording sheet by a device that receives the facsimile data.

The preview corresponding function allows the user to view the preview screen 65 to check the scanned image before the particular processing based on the scanned data is executed. The user can instruct processing of the scanned data to cause execution of the particular processing based on the scanned data. The processing of the scanned data may be instructed by a selecting operation, e.g., tapping, for the start button 67 displayed on the preview screen 65, for example.

Configuration of Information Processing Device 20

The information processing device 20, for example, is an information processing terminal such as a personal computer, a tablet computer, and a smartphone. As illustrated in FIG. 1, the information processing device 20 includes a controller 21, a storage 22, an input interface 23, a display device 24, and a communication interface 25.

The controller 21 includes a CPU, for example. The storage 22 includes semiconductor memories including a ROM, a RAM, an NVRAM, and a flash memory, for example. That is, the information processing device 20 in the present embodiment includes a microcomputer including the CPU and the semiconductor memories. The storage 22 stores various kinds of software and data.

The display device 24 includes a display configured to display an image, such as a liquid crystal display and an organic electroluminescent (EL) display. The input interface 23 includes an input device for accepting various input operations. The input device of the input interface 23 includes a keyboard, a mouse, and a touch screen, for example. The touch screen is superposed on an image display region of the display of the display device 24.

The communication interface 25 is an interface for communicating with an external device over the network 3. The information processing device 20 is capable of performing data communication with the image processing apparatus 10 via the communication interface 25.

Screen Transition in Performing of Preview Corresponding Function

There will be next described screen transition in performing of the preview corresponding function by taking the case of performing of the copying function as an example. When the controller 11 of the image processing apparatus 10 is activated, the controller 11 executes an initial processing to control the display device 13 to display a waiting screen 40 illustrated in FIG. 2. The waiting screen 40 functions as a start-off screen when the user uses the image processing apparatus 10 to perform various functions.

The waiting screen 40 contains a plurality of function buttons each for performing a corresponding one of the functions. The waiting screen 40 illustrated in FIG. 2 contains a Fax button 41, a Copy button 42, and a Scan button 43 as the plurality of function buttons by way of example. When the Fax button 41 is selected, the controller 11 performs the facsimile function. When the Copy button 42 is selected, the controller 11 performs the copying function. When the Scan button 43 is selected, the controller 11 performs the scanning function.

The waiting screen 40 contains a Shortcut button 44. When the Shortcut button 44 is selected, the display device 13 displays a shortcut screen, not illustrated. The shortcut screen contains one or more shortcut icon. One of particular functions is registered with a corresponding one of the shortcut icons. When any one of the shortcut icons is selected, the image processing apparatus 10 performs the particular function registered with the shortcut icon.

The user can register a function with the shortcut icon. The user can also register the preview corresponding function with the shortcut icon. When the shortcut icon with which the preview corresponding function is registered is selected, as described above, the preview screen 65 containing the preview image 66 representing the scanned image is displayed before the scanned data is processed.

Here, it is assumed that the user has instructed the image processing apparatus 10 to perform the copying function as one of the preview corresponding functions. Specifically, it is assumed that the Copy button 42 is selected, for example.

In this case, a copy-setting screen 50 illustrated in FIG. 2 is displayed on the display device 13. The copy-setting screen 50 contains a plurality of setting-value display buttons. The plurality of setting-value display buttons include a scaling-setting display button 51, a duplex-copy-setting display button 52, a tray-setting display button 53, and a copy-image-quality-setting display button 54, for example.

Displayed on the scaling-setting display button 51 is the current setting value of a copy scale that indicates an enlargement/reduction ratio to be used for printing of the scanned image on the recording sheet. Displayed on the duplex-copy-setting display button 52 is the current setting value of a duplex-copy setting that indicates whether the scanned image or images are to be printed on one side or both sides of the recording sheet. Displayed on the tray-setting display button 53 is the current setting value of a tray being used which indicates a tray supporting the recording sheet to be used for printing of the scanned image. Displayed on the copy-image-quality-setting display button 54 is the current setting value of a copy image quality that indicates an image quality for printing of the scanned image on the recording sheet. The user can view each of the setting-value display buttons to check the current setting value of a corresponding one of the various setting items in the copying function. It is noted that the setting-value display buttons different from the buttons 51-54 may be displayed or displayable.

The copy-setting screen 50 contains a Change Setting button 56, a B/W Start button 57, and a Color Start button 58. In the present embodiment, the various setting items settable for performing of the copying function include not only the copy scale, the duplex-copy setting, the tray being used, and the copy image quality but also the number of copies, a sheet type, a sheet size, and layout copy, for example. The number of copies indicates the number of the recording sheets on which the same scanned image is to be printed. The sheet type indicates the type of the recording sheet on which the scanned image is to be printed. The sheet size is the size of the recording sheet on which the scanned image is to be printed. The layout copy indicates the size of one scanned image to be printed on one recording sheet or a plurality of the recording sheets. A plurality of selectable setting values are provided for each of the setting items. The user can set any one of the setting values for each of the setting items.

The setting value for the setting item is changeable by selecting the Change Setting button 56 displayed on the copy-start screen 50, for example. When the Change Setting button 56 is selected, the display device 13 displays a setting-item screen, not illustrated. A plurality of setting-item buttons are displayed on the setting-item screen for each setting item. When any one of the setting-item buttons is selected, the display device 13 displays a setting-value selection screen, not illustrated, for selection of one of setting values for the setting item corresponding to the selected setting-item button. The setting-value selection screen contains a plurality of buttons respectively corresponding to the selectable setting values. When one of the plurality of buttons is selected, the setting value corresponding to the selected button is selected and set.

When the B/W Start button 57 or the Color Start button 58 is selected on the copy-setting screen 50, the copying function is started. When the B/W Start button 57 is selected, an image formed on the document is printed in white and black. When the Color Start button 58 is selected, an image formed on the document is printed in color.

When the copying function is started, the scanning function is initially performed to read an image formed on the document to create the scanned data. The display device 13 displays a scanning-state screen 60 illustrated in FIG. 2 during performing of the scanning function. When the scanned data is created, the display device 13 displays the preview screen 65 containing a preview image of a scanned image.

When the start button 67 is selected on the preview screen 65, as described above, the controller 11 executes the particular processing based on the scanned data. The particular processing in the example in FIG. 2 is a processing for printing an image based on the scanned data.

In the case where a no-operation time-out has occurred after the preview screen 65 is displayed, the controller 11 stores the scanned data and switches the screen displayed on the display device 13, from the preview screen 65 to the waiting screen 40 illustrated in FIG. 3. The no-operation time-out includes a passage of a first particular length of time without selection of the start button 67 after the preview screen 65 is displayed.

As illustrated in FIG. 3, a first information bar 46 is displayed on the waiting screen 40 that is displayed when the no-operation time-out has occurred after the preview screen 65 is displayed. The first information bar 46 contains a first message indicating that the particular processing based on the scanned data has not been executed.

The first message in the present embodiment, for example, includes a message "Preview content has not been printed. Please tap information bar to start printing." The first message may have any information. In the case where the entire first message cannot be displayed on the first information bar 46 at a time, the first message may be scrolled in response to a flick operation of the user and may automatically flow in a specific direction, for example. In another example, when the first information bar 46 is selected, the entire first message may pop up.

Screen transition from the state in which the waiting screen 40 containing the first information bar 46 is being displayed is different principally depending upon whether a first event or a second event occurs. Examples of the first event include: selection of the first information bar 46; and a new instruction of performing a function similar in kind to a scanned and suspended function.

The scanned and suspended function is a function in which a state in which the particular processing based on the scanned data has not been executed is established though reading of the document is completed at the time just before the first information bar 46 being displayed is displayed. Thus, the function similar in kind to the scanned and suspended function in the example in FIG. 3 is the copying function. Accordingly, selection of the Copy button 42 on the waiting screen 40 illustrated in FIG. 3 is included in the first event, for example.

One example of the second event is a passage of a second particular length of time without any selecting operation on the waiting screen 40 after the screen displayed on the display device 13 is switched from the preview screen 65 to the waiting screen 40 in response to the no-operation timeout.

In the case where the first information bar 46 is selected on the waiting screen 40 containing the first information bar 46, the display device 13 displays a first notification screen 70 illustrated in FIG. 3. The first notification screen 70 contains a continuation confirmation message 71, a Yes button 72, and a No button 73. The continuation confirmation message 71 asks the user whether the particular processing based on the scanned data having already been created and stored is to be executed. By viewing the continuation confirmation message 71, the user can recognize that the scanned and suspended function is present.

When the No button 73 is selected on the first notification screen 70, the screen is switched to the waiting screen 40 containing the first information bar 46. When the Yes button 72 is selected on the first notification screen 70, the image processing apparatus 10 performs the scanned and suspended function. In the example in FIG. 3, a scanned image represented by the stored scanned data is printed in the printing function. After performing the function, the screen displayed on the display device 13 may be switched to the waiting screen 40 in FIG. 2 or to a particular screen corresponding to the performed function. In the example in FIG. 3, the screen displayed on the display device 13 may be switched to the copy-setting screen 50 illustrated in FIG. 2 after performing the function, for example.

Also in the case where the user has operated the waiting screen 40 containing the first information bar 46 to newly instruct the image processing apparatus 10 to perform the function similar in kind to the scanned and suspended function, the display device 13 displays the first notification screen 70 as in the case where the first information bar 46 is selected. In this case, a processing to be executed in the case where the Yes button 72 is selected is similar to a processing to be executed in the case where the Yes button 72 is selected on the first notification screen 70 displayed in response to selection of the first information bar 46, and the scanned and suspended function is performed.

In the case where the No button 73 is selected on the first notification screen 70 displayed in response to a new instruction for performing the function similar in kind to the scanned and suspended function, the screen displayed on the display device 13 is switched to the copy-setting screen 50 (see FIG. 2) while keeping the scanned data. In this case, the user can cause the image processing apparatus 10 to newly perform the copying function. After the completion of the new copying function, for example, the waiting screen 40 containing the first information bar 46 may be displayed again.

The stored scanned data is deleted in the case where the second event has occurred in the state in which the waiting screen 40 containing the first information bar 46 is displayed, for example. The screen displayed on the display device 13 is switched to the waiting screen 40 containing a second information bar 47 illustrated in FIG. 4. The second information bar 47 contains a second message indicating that the particular processing based on the scanned data has not been executed and that operations need to be performed from reading of a document again in the case where the user wants to continue the scanned and suspended function (in other words, the store scanned data is deleted).

The second message in the present embodiment, for example, includes a message "Preview content has not been printed. Please read a document again to perform printing." The second message may have any information. In the case where the entire second message cannot be displayed on the second information bar 47 at a time, the second message may be displayed in various manners as in the case of the first message on the first information bar 46.

In the case where the second information bar 47 is selected on the waiting screen 40 containing the second information bar 47, the display device 13 displays a second notification screen 80 illustrated in FIG. 4. The second notification screen 80 contains a suspended-function cancel message 81 and a Close button 82. The suspended-function cancel message 81 notifies the user that the particular processing based on the scanned data in the function suspended after scanning has not been executed and that operations need to be performed from reading of a document again in the case where the user wants to continue the function because the scanned data is deleted. By viewing the suspended-function cancel message 81, the user can recognize the requirement of performing scanning again in the case where the user wants to complete copying of the document that had been read.

When the Close button 82 is selected on the second notification screen 80, the screen displayed on the display device 13 is switched to the waiting screen 40 illustrated in FIG. 2, i.e., the normal waiting screen 40 not containing any of the first information bar 46 and the second information bar 47.

Main Process

Figure 5:
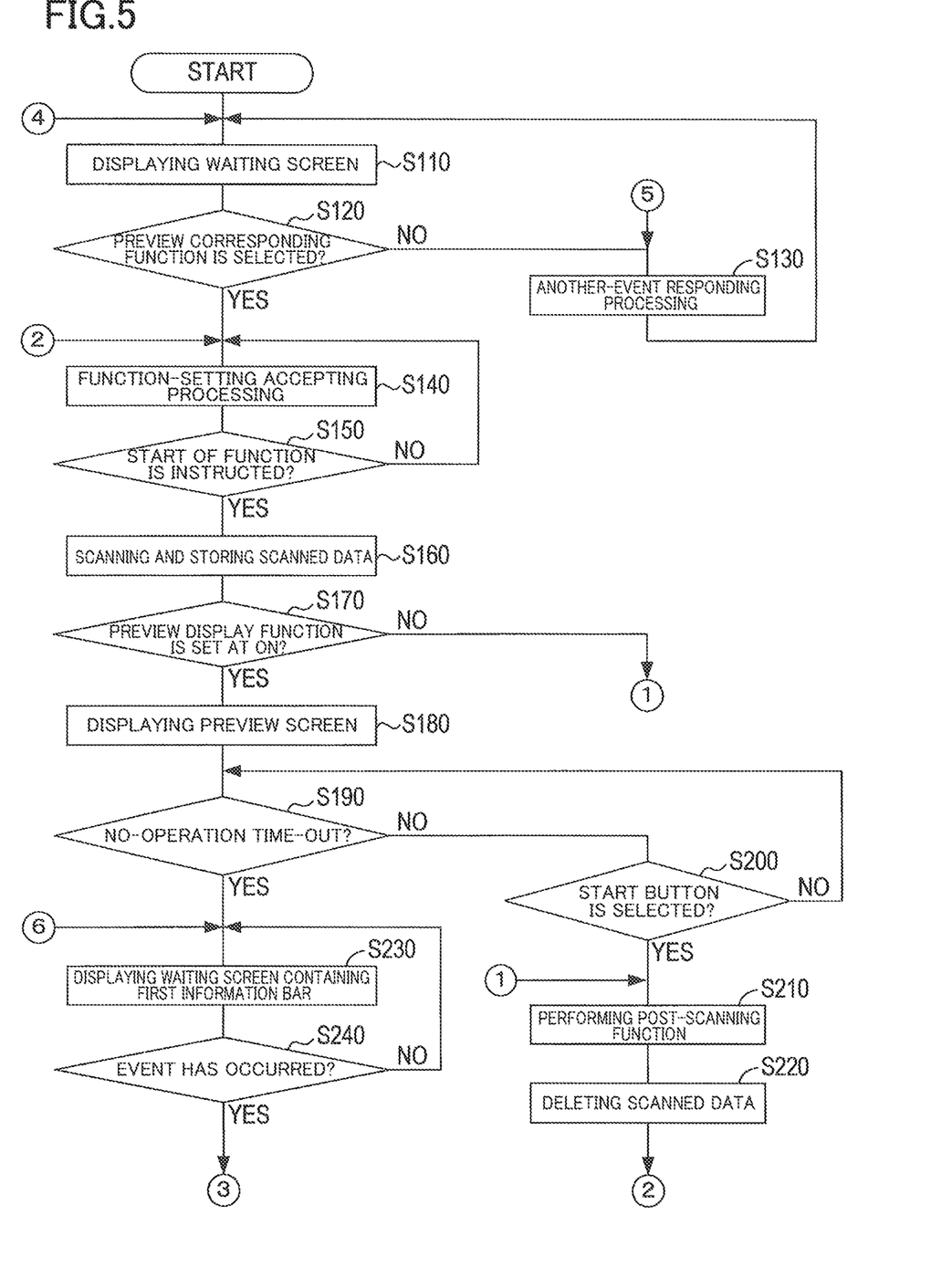
FIG. 5 is a flowchart representing a portion of a main process.
Figure 6:
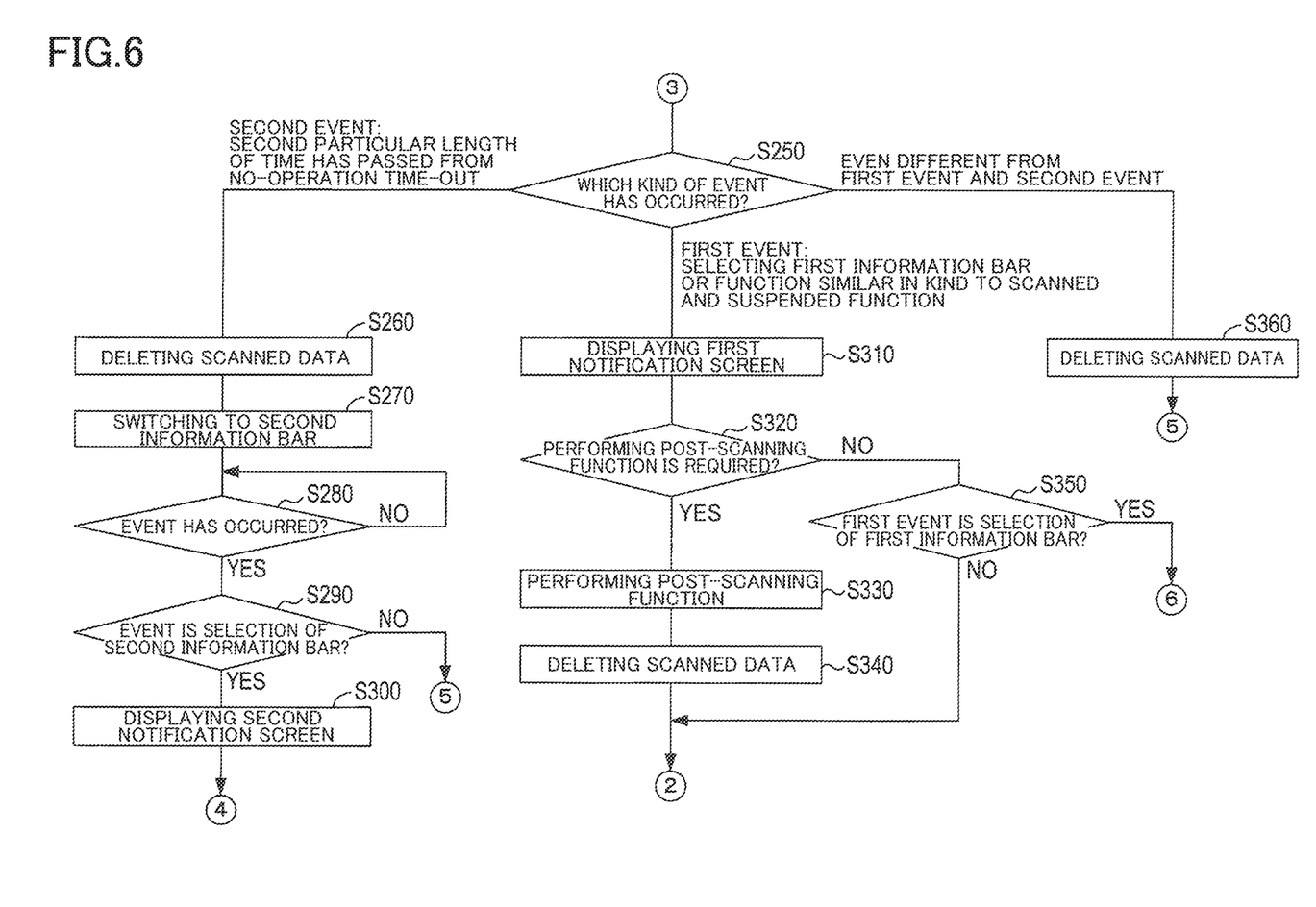
FIG. 6 is a flowchart representing the other portion of the main process (continued from FIG. 5).

There will be next described, with reference to FIGS. 5 and 6, a main process executable by the controller 11 to perform the above-described screen transition. When activated by receiving electric power supplied from a power source, the controller 11 reads a program for the main process from the storage 12 and executes the program.

The main process begins with S110 at which the controller 11 displays the waiting screen 40 on the display device 13. The controller 11 at S120 determines whether performing of the preview corresponding function is selected. When performing the preview corresponding function is not selected, the controller 11 executes an another-event responding processing at S130. Specifically, when an event different from selection of the preview corresponding function has occurred, the controller 11 executes a processing corresponding to the event. After the completion of the processing at S130, this flow goes to S110. Also when no event has occurred at S130, this flow goes to S110.

When the controller 11 at S120 determines that performing the preview corresponding function is selected, the controller 11 executes a function-setting accepting processing at S140. Specifically, the controller 11 controls the display device 13 to display a function setting screen corresponding to the selected preview corresponding function and accept setting of various setting values to be used for performing the function. In the case where the preview corresponding function selected at S120 is the copying function, for example, the controller 11 at S140 displays the copy-setting screen 50 illustrated in FIG. 2 to accept setting of various setting values to be used for the copying function.

At S140, a function of displaying the preview screen 65 (hereinafter referred to as "preview display function") can be set to ON or OFF, selectively. In the case where the preview display function is set to ON, the preview screen 65 is displayed when the preview corresponding function is performed. In the case where the preview display function is set to OFF, when the preview corresponding function is performed, the image processing apparatus 10 performs the function without displaying the preview screen 65. In the present embodiment, the preview display function is set at ON in the default setting, for example. Thus, as long as the preview display function is changed to OFF intentionally by the user, the preview screen 65 is displayed when the preview corresponding function is performed.

It is noted that the default setting for the preview function may be OFF. The default setting value for the preview function may be determined by the user as desired. In the case where the setting for the preview function is changed from the default setting, the controller 11 may keep the changed setting state and may change the setting to the default setting after the function is performed. It is not essential that the preview function is settable to ON or OFF, and the controller 11 may display the preview screen 65 when the preview corresponding function is performed.

The controller 11 at S150 determines whether the start of the function is instructed by the user. In the example in FIG. 2, selection of the B/W Start button 57 or the Color Start button 58 on the copy-setting screen 50 corresponds to instructing the start of the function. When the start of the function is not instructed, this flow goes to S140. When the start of the function is instructed, this flow goes to S160.

The controller 11 at S160 performs the scanning function to read an image formed on the document to create the scanned data. The controller 11 stores the created scanned data into the storage 12. The controller 11 at S170 determines whether the preview display function is set at ON. When the preview display function is set at OFF, this flow goes to S210 at which the controller 11 performs a post-scanning function. That is, the controller 11 completes the preview corresponding function by performing the remaining function to be executed after creation of the scanned data, in the preview corresponding function being executed. The controller 11 at S220 deletes the stored scanned data, and this flow goes to S140.

When the controller 11 at S170 determines that the preview display function is set at ON, the controller 11 at S180 displays the preview screen 65 on the display device 13. The controller 11 at S190 determines whether the no-operation time-out has occurred. When the no-operation time-out has not occurred, the controller 11 at S200 determines whether the start button 67 displayed on the preview screen 65 is selected. When the start button 67 is selected, this flow goes to S210 at which the controller 11 performs the post-scanning function. When the start button 67 is not selected, this flow goes to S190.

When the controller 11 at S190 determines that the no-operation time-out has occurred, the controller 11 executes a processing at S230 while keeping the state in which the scanned data is stored. The controller 11 at S230 controls the display device 13 to display the waiting screen 40 containing the first information bar 46 (see FIG. 3). The controller 11 at S240 determines whether an event has occurred. When no event has occurred, this flow goes to S230. When an event has occurred, this flow goes to S250 (see FIG. 6).

The controller 11 at S250 determines which kind of the event has occurred. When the event having occurred is not any of the first event and the second event, the controller 11 at S360 deletes the scanned data stored at S160, and this flow goes to S130. In this case, the controller 11 at S130 executes a processing related to the event having occurred, and this flow goes to S110.

When the controller 11 at S250 determines that the event having occurred is the first event, this flow goes to S310. The controller 11 at S310 displays the first notification screen 70 (see FIG. 3) on the display device 13. The controller 11 at S320 determines whether performing of the post-scanning function is required, based on user's operation. On the first notification screen 70 illustrated in FIG. 3, selection of the Yes button 72 corresponds to a request of performing the post-scanning function, and selection of the No button 73 corresponds to an instruction of not requiring performing of the post-scanning function.

When the user has performed an operation of requiring performing of the post-scanning function, the controller 11 at S330 performs the post-scanning function as in the processing at S210. The controller 11 at S340 deletes the scanned data used in the post-scanning function, from the storage 12 as in the processing at S220, and this flow goes to S140 (see FIG. 5).

When the controller 11 at S320 determines that performing of the post-scanning function is not required, this flow goes to S350. The controller 11 at S350 determines whether the first event having occurred is selection of the first information bar 46. When the first event having occurred is selection of the first information bar 46, this flow goes to S230 (see FIG. 5) at which the controller 11 displays the waiting screen 40 containing the first information bar 46. When the first event having occurred is an event different from selection of the first information bar 46, this flow goes to S140. In this case, as described with reference to FIG. 3, the controller 11 at S140 displays the function setting screen for the function corresponding to the event having occurred.

When the controller 11 at S250 determines that the event having occurred is the second event, this flow goes to S260. The controller 11 at S260 deletes the scanned data stored at S160. The controller 11 at S270 switches the information bar displayed on the waiting screen 40, from the first information bar 46 to the second information bar 47 (see FIG. 4).

The controller 11 at S280 determines whether an event has occurred. When an event has occurred, this flow goes to S290. The controller 11 at S290 determines whether the event having occurred is selection of the second information bar 47. When the event having occurred is not selection of the second information bar 47, this flow goes to S130. When the event having occurred is selection of the second information bar 47, this flow goes to S300.

The controller 11 at S300 displays the second notification screen 80 (see FIG. 4) on the display device 13. When the Close button 82 is selected on the second notification screen 80, this flow goes to S110.

Effects

In the image processing apparatus 10 according to the present embodiment, as described above, the screen displayed on the display device 13 is switched to the waiting screen 40 in the case where the no-operation time-out has occurred after the preview screen 65 is displayed when the preview corresponding function is performed. This configuration enables the controller 11 to perform another function without waiting for the completion of the post-scanning function.

The first information bar 46 is displayed on the waiting screen 40 switched from the preview screen 65 in response to the no-operation time-out. This configuration allows the user to recognize that, though an image formed on the document is read, a processing to be executed after the image reading has not been executed. Thus, the user can cause the image processing apparatus 10 to execute the post-scanning processing based on the stored scanned data in accordance with the content of the first information bar 46. This makes it possible to provide the image processing apparatus 10 highly convenience to the user.

In the case where the waiting screen 40 containing the first information bar 46 is displayed, the user can select the first information bar 46 to restart the scanned and suspended function. In the case where the waiting screen 40 containing the first information bar 46 is displayed, the user can instruct performing of the function similar in kind to the scanned and suspended function to perform the instructed function while keeping the state in which the scanned data is stored.

The scanned data is deleted in the case where the second event has occurred after the waiting screen 40 containing the first information bar 46 is displayed in response to the occurrence of the no-operation time-out, that is, in the case where the second particular length of time has passed without any selection on the waiting screen 40. Some users may have forgotten performing an operation after the preview screen 65 is displayed, though having instructed performing of the preview corresponding function. In this case, there is a possibility that the stored scanned data will become unnecessary data without being used thereafter. To solve this problem, in the present embodiment as described above, the scanned data is deleted in the case where the second event has further occurred after the waiting screen 40 containing the first information bar 46 is displayed. This enables an appropriate use of a storage area of the storage 12 for the scanned data.

In the case where the second event has occurred, the scanned data is deleted, and the second information bar 47 is displayed on the waiting screen 40 instead of the first information bar 46. This configuration allows the user to recognize that the scanned data has been deleted, by viewing the second information bar 47.

In the present embodiment, selection of the first information bar 46 on the waiting screen 40 containing the first information bar 46 is one example of a particular input operation. Selection of the Yes button 72 on the first notification screen 70 is one example of a continuation request. The recording sheet is one example of a recording medium.

The processing at S160 is one example of a reading processing and a storing processing. The processing at S180 is one example of a preview-screen display processing. The processings at S200-S210 are one example of a read-image processing. The processing at S230 is one example of a waiting-screen display processing and a message display processing. The processing at S260 is one example of a deleting processing. The processing at S270 is one example of a message changing processing. The processing at S310 is one example of an execution confirmation processing. The processing at S330 is one example of an execution-request responding processing. The processing at S360 and the processing at S130 continued from the processing at S360 are one example of an another-function responding processing.

Modifications

While the embodiment has been described above, it is to be understood that the disclosure is not limited to the details of the illustrated embodiment, but may be embodied with various changes and modifications, which may occur to those skilled in the art, without departing from the spirit and scope of the disclosure.

In the case where the No button 73 is selected on the first notification screen 70 displayed when performing of the function similar in kind to the scanned and suspended function is selected in the state in which the waiting screen 40 containing the first information bar 46 is displayed, the following processings may be executed.

In one example, the controller 11 may delete the stored scanned data and perform the selected function similar in kind to the scanned and suspended function. In another example, the controller 11 may determine whether the stored scanned data is to be kept or deleted, in accordance with an amount of new scanned data created by performing the selected function similar in kind to the scanned and suspended function. For example, the controller 11 may delete the stored scanned data in the case where an amount of empty space of the storage area of the storage 12 for storing the scanned data is less than the amount of the created new scanned data.

The screens illustrated in FIGS. 2-4 are one example, and each of the screens may have any content. For example, the controller 11 at S230 controls the display device 13 to display the waiting screen 40 containing the first information bar 46 instead of the preview screen 65, but the present disclosure is not limited to this configuration, and the preview screen 65 may contain the first message indicating that the particular processing based on the scanned data has not been executed or the first information bar 46 containing the message to notify the user of the first message. The controller 11 at S230 displays the waiting screen 40 on the display device 13 when no operation is performed for a particular period from the time when the preview screen 65 is displayed on the display device 13 at S180, but the display device 13 may display the waiting screen 40 after the display device 13 displays the preview screen 65, for example, when a particular operation is input via the input interface 14. The controller 11 at S260 deletes the stored scanned data when no operation is performed for a particular period from the time when the waiting screen 40 is displayed at S230, but the present disclosure is not limited to this configuration, and the controller 11 may delete the stored scanned data when a particular operation is input via the input interface 14 after the waiting screen 40 is displayed. The controller 11 may at S310 display the first notification screen 70 on the display device 13 when a particular operation is input via the input interface 14 after the waiting screen 40 is displayed at S230, or when a particular period has passed from the time when the waiting screen 40 is displayed on the display device 13, for example.

The plurality of functions of one element in the above-described embodiment may be achieved by a plurality of elements, and one function of one element may be achieved by a plurality of elements. A plurality of functions of a plurality of elements may be achieved by one element, and one function achieved by a plurality of elements may be achieved by one element. The configurations in the above-described embodiment may be omitted partly. At least a portion of the configurations in the above-described embodiment may be added to or replaced with another portion of the configurations in the above-described embodiment.

What is claimed is:

1. An image processing apparatus, comprising:
   a reading device;
   a display device;
   an input interface; and
   a controller configured to execute:
   a reading processing in which the controller controls the reading device to read an image formed on a reading medium to create read-image data;
   a preview-screen display processing in which the controller controls the display device to display a preview screen containing a preview image that is the image read in the reading processing;
   a read-image processing in which the controller executes a particular processing based on the read-image data when a processing executing instruction is input via the input interface after the preview screen is displayed in the preview-screen display processing; and
   a waiting-screen display processing in which, when a first particular length of time has passed, without input of the processing executing instruction, from a time when the preview screen is displayed in the preview-screen display processing, the controller controls the display device to switch the displayed screen on the display device from the preview screen to a waiting screen containing a first message indicating that the particular processing has not been executed and not containing the preview image that has been displayed on the preview screen.

2. The image processing apparatus according to claim 1, further comprising a storage,
   wherein the controller is configured to execute a storing processing in which the controller stores the read-image data obtained in the reading processing, into the storage, and
   wherein the controller is configured to execute the waiting-screen display processing while keeping the read-image data stored in the storage, when the first particular length of time has passed without input of the processing executing instruction after the preview screen is displayed in the preview-screen display processing.

3. The image processing apparatus according to claim 2, wherein the controller is configured to execute a deleting processing in which the controller deletes the read-image data stored in the storage when a second particular length of time has passed from a time when the waiting screen containing the first message is displayed in the waiting-screen display processing.

4. The image processing apparatus according to claim 3, wherein the controller is configured to execute a message changing processing in which the controller displays a second message indicating that the read-image data has been deleted, on the waiting screen instead of or in addition to the first message when the second particular length of time has passed from the time when the waiting screen containing the first message is displayed in the waiting-screen display processing.

5. The image processing apparatus according to claim 2, wherein the controller is configured to execute:
   an execution confirmation processing in which, after the waiting screen containing the first message is displayed in the waiting-screen display processing, the controller controls the display device to display an execution confirmation message asking whether the particular processing is to be executed based on the read-image data; and
   an execution-request responding processing in which the controller executes the particular processing when an execution request for requesting execution of the particular processing is input after the execution confirmation message is displayed in the execution confirmation processing.

6. The image processing apparatus according to claim 5, wherein the controller is configured to control the display device to display the execution confirmation message in the execution confirmation processing when a particular input operation is performed with the input interface in a state in which the waiting screen containing the first message is displayed.

7. The image processing apparatus according to claim 5, wherein the controller controls the display device to display the execution confirmation message in the execution confirmation processing when an executing instruction for executing a function including the particular processing is input in a state in which the waiting screen containing the first message is displayed.

8. The image processing apparatus according to claim 2, wherein the controller is configured to, when an executing instruction for executing a function not including the particular processing is input after the waiting screen containing the first message is displayed in the waiting-screen display processing, execute an another-function responding processing in which the controller deletes the read-image data stored in the storage and performs a function related to the executing instruction.

9. The image processing apparatus according to claim 1, further comprising a printing device configured to print an image on a recording medium,
   wherein the particular processing comprises a processing in which the controller controls the printing device to print the preview image.

10. An image processing method comprising:
    a reading step of reading an image formed on a reading medium to create read-image data;
    a preview-screen displaying step of displaying a preview screen containing a preview image that is the image read in the reading step;
    a read-image processing step of executing a particular processing based on the read-image data when a processing executing instruction is input after the preview screen is displayed in the preview-screen displaying step; and
    a waiting-screen displaying step of switching the displayed screen on the display device from the preview screen to a waiting screen containing a first message indicating that the particular processing has not been executed and not containing the preview image that had been displayed on the preview screen, when a first particular length of time has passed, without input of the processing executing instruction, from a time when the preview screen is displayed in the preview-screen displaying step.

11. A non-transitory storage medium storing a plurality of instructions executable by a processor of an image processing apparatus comprising a reading device and a display device,
    the plurality of instructions, when executed by the processor, causing the image processing apparatus to execute:

a reading processing in which the image processing apparatus controls the reading device to read an image formed on a reading medium to create read-image data;

a preview-screen display processing in which the image processing apparatus controls the display device to display a preview screen containing a preview image that is the image read in the reading processing;

a read-image processing in which the image processing apparatus executes a particular processing based on the read-image data when a processing executing instruction is input via the input interface after the preview screen is displayed in the preview-screen display processing; and a waiting-screen display processing in which, when a first particular length of time has passed, without input of the processing executing instruction, from a time when the preview screen is displayed in the preview-screen display processing, the image processing apparatus controls the display device to switch the displayed screen on the display device from the preview screen to a waiting screen containing a first message indicating that the particular processing has not been executed and not containing the preview image that has been displayed on the preview screen.

12. An image processing apparatus, comprising:
a reading device;
a display device;
an input interface; and
a controller configured to execute:
  a reading processing in which the controller controls the reading device to read an image formed on a reading medium to create read-image data;
  a preview-screen display processing in which the controller controls the display device to display a preview screen containing a preview image that is the image read in the reading processing;
  a read-image processing in which the controller executes a particular processing based on the read-image data when a processing executing instruction is input via the input interface after the preview screen is displayed in the preview-screen display processing; and
  a message display processing in which, after the preview screen is displayed in the preview-screen display processing, the controller controls the display device to switch the displayed screen on the display device from the preview screen to a waiting screen containing a first message indicating that the particular processing has not been executed and not containing the preview image that has been displayed on the preview screen.

13. The image processing apparatus according to claim 12, further comprising a storage,
wherein the controller is configured to execute a deleting processing in which the controller deletes the read-image data stored in the storage, after the first message is displayed on the display device in the message display processing.

14. The image processing apparatus according to claim 12, wherein the controller is configured to execute:
an execution confirmation processing in which, after the first message is displayed on the display device in the message display processing, the controller controls the display device to display an execution confirmation message asking whether the particular processing is to be executed based on the read-image data; and
an execution-request responding processing in which the controller executes the particular processing when an execution request for requesting execution of the particular processing is input after the execution confirmation message is displayed in the execution confirmation processing.

\* \* \* \* \*

UNITED STATES PATENT AND TRADEMARK OFFICE
CERTIFICATE OF CORRECTION

PATENT NO. : 11,128,769 B2  
APPLICATION NO. : 16/815618  
DATED : September 21, 2021  
INVENTOR(S) : Shen et al.

Page 1 of 1

It is certified that error appears in the above-identified patent and that said Letters Patent is hereby corrected as shown below:

On the Title Page

Item (73), Assignee:  
Delete "KABUSHTKI" and insert -- KABUSHIKI --, therefor.

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*